United States Patent [19]

Ruiz et al.

[11] Patent Number: 4,756,874

[45] Date of Patent: Jul. 12, 1988

[54] MINIMIZATION OF RADIOACTIVE MATERIAL DEPOSITION IN WATER-COOLED NUCLEAR REACTORS

[75] Inventors: Carl P. Ruiz, Fremont; David M. Blaies, San Jose, both of Calif.

[73] Assignee: General Electric Company, San Jose, Calif.

[21] Appl. No.: 944,783

[22] Filed: Dec. 22, 1986

[51] Int. Cl.$^4$ ................................................ G21C 9/00
[52] U.S. Cl. ..................................... 376/306; 376/904
[58] Field of Search ................ 376/305, 306, 904, 906

[56] References Cited

U.S. PATENT DOCUMENTS

| | | | |
|---|---|---|---|
| 3,133,028 | 5/1964 | Channabasappa | 252/389 |
| 3,580,934 | 5/1971 | Murray et al. | 376/306 |
| 3,699,052 | 10/1972 | Petrey, Jr. et al. | 376/306 |
| 3,755,117 | 8/1973 | Hart | 204/140 |
| 3,766,023 | 10/1973 | Hart | 204/38 B |
| 3,804,730 | 4/1974 | Evans | 204/56 R |
| 3,839,096 | 10/1974 | Skedgell et al. | 148/6.2 |
| 3,850,767 | 11/1974 | Skedgell et al. | 204/56 R |

FOREIGN PATENT DOCUMENTS

| | | | |
|---|---|---|---|
| 2050152 | 4/1972 | Fed. Rep. of Germany | 376/306 |
| 79196 | 5/1983 | Japan | 376/306 |
| 1093996 | 5/1986 | Japan | 376/306 |
| 1095290 | 5/1986 | Japan | 376/306 |

OTHER PUBLICATIONS

L. L. Shreir ed., *Corrosion*, vol. 2, Corrosion Control, 1976, pp. 14:37–14:46.

*Primary Examiner*—Deborah L. Kyle
*Assistant Examiner*—Richard W. Wendtland
*Attorney, Agent, or Firm*—Robert R. Schroeder

[57] ABSTRACT

In water-cooled nuclear reactors where zinc is added to the water to remove or lessen the accumulation of radioactive cobalt, radioactivity arising from the zinc itself as a result of neutron capture is lessened or eliminated entirely by modifying the isotopic composition of the zinc prior to its injection into the system. The modification of the isotopic composition consists of lowering the proportion of $^{64}Zn$ or removing this isotope entirely.

21 Claims, No Drawings

MINIMIZATION OF RADIOACTIVE MATERIAL DEPOSITION IN WATER-COOLED NUCLEAR REACTORS

BACKGROUND OF THE INVENTION

This invention relates to the operation and safety of water-cooled nuclear reactors, and in particular to methods for minimizing the dangers of exposure of workers to radioactive emissions during reactor shutdown.

A major hazard in water-cooled nuclear reactors is the accumulation of radioactive substances in the structural portions of the reactor. During reactor shutdown, workers are exposed to stainless steel internal walls and piping surfaces, and radioactive materials retained in oxide films which have accumulated on these surfaces are a major source of radiation exposure.

The introduction of certain metallic ions, including zinc, has been used to remove or lessen such deposition. Zinc however is itself a source of radioactivity in these reactors, and this radioactivity limits the effectiveness of the use of zinc.

SUMMARY OF THE INVENTION

The present invention provides for using zinc which has a lower content of the $^{64}Zn$ isotope than naturally occurring zinc. This isotope is the isotope in greatest abundance in naturally occurring zinc, comprising approximately 50% thereof, and has a tendency to undergo neutron capture inside a nuclear reactor to produce $^{65}Zn$, in an amount proportional to the concentration of $^{64}Zn$. In accordance with the present invention, the production of $^{65}Zn$ is lessened if not eliminated entirely by using zinc in which the $^{64}Zn$ is either reduced in proportion to the other isotopes or entirely absent.

DETAILED DESCRIPTION OF THE INVENTION

Naturally occurring zinc has an approximate isotopic composition as follows:

| Isotope | Concentration (%) |
| --- | --- |
| $^{64}Zn$ | 48.6 |
| $^{66}Zn$ | 27.9 |
| $^{67}Zn$ | 4.1 |
| $^{68}Zn$ | 18.8 |
| $^{70}Zn$ | 0.6 |

The zinc used in accordance with the present invention has a composition in which the $^{64}Zn$ is present in a substantially lower proportion than that indicated above, the term "substantially lower" referring to any amount which results in a significant lessening of the amount of radiation that arises from the zinc itself due to its exposure to neutron irradiation inside the reactor. In more specific terms, it is preferred that the proportoin of $^{64}Zn$ be lowered to less than about 10%, particularly less than about 1%. It is most preferred that the zinc be substantially devoid of the isotope.

Treatment of the zinc to reduce the $^{64}Zn$ content or to remove the latter entirely may be done according to conventional techniques for isotope separation of metals. Application of these techniques to zinc is within the routine skill of those skilled in the art.

One such separation process is the gaseous-diffusion process. According to this process, zinc is first highly purified and converted to the vapor state, generally by reaction to form volatile compounds such as fluorinated zinc alkyls. The vaporized compound is then pumped through a series of diffusion aggregates arrayed in cells in a cascade pattern. The various isotopes diffuse through the cells at slightly different rates, permitting separation. High degrees of separation may be achieved by the use of multiple stages.

Another example is centrifugal isotope separation, again using zinc in the vapor state. Dimethyl fluorinated zinc is one example of a volatile zinc compound which renders zinc susceptible to this kind of separation.

Other methods of separation include electromagnetic separation, liquid thermal diffusion, and laser excitation. In the laser excitation process, zinc vapor is ionized by means of a tunable lazer specific to a wavelength which selectively excites $^{64}Zn$ atoms to form positive ions, which are then collected on a negative electrode. The remaining vapor is accordingly comprised of zinc depleted of this isotope. Still further methods will be known to those skilled in the art.

Once the zinc has been treated to reduce or eliminate its $^{64}Zn$ content, it is added to the reactor water in any form which will result in zinc ion in solution. The zinc may thus be added in the form of a salt such as, for example, zinc chromate, or as zinc oxide. With zinc oxide, no extraneous anions are added. The use of zinc oxide is preferred.

The major component of radioactive deposition on the walls of water-bearing vessels in nuclear reactors is radioactive cobalt. While inhibition of the radioactive cobalt deposition may be achieved with very small amounts of zinc, the actual amount used is not critical and may vary over a wide range. For most applications, a concentration from about 1 to about 1,000 ppb (parts per billion by weight). preferably from about 3 to about 100 ppb, maintained in the reactor water during operation of the reactor will provide the best results.

The invention may be applied to any waterbearing vessel in a nuclear reactor in which radioactive depositions tend to occur. Such vessels may include tubes, shells, feed and recirculation piping, and transfer and storage vessels in general. Recirculation piping is of particular concern, since it is a major source of exposure to plant workers during maintenance shutdowns. The zinc oxide may be added through feedlines to such vessels or, where appropriate, to recirculation lines branching off of such vessels.

The zinc oxide may be added in any form which permits it to be dissolved in the reactor water. Examples include slurries, pastes, and preformed solutions. When pastes or slurries are used, the zinc oxide is preferably in the form of a finely divided powder, fumed zinc oxide being most preferred. The zinc oxide contents in these pastes and slurries are not critical, since the concentration in the reactor vessels where the zinc oxide is needed may be controlled by the rate of addition of the paste or slurry to the incoming water. In most cases, pastes will have zinc oxide contents ranging from about 25% to about 95% by weight, preferably from about 40% to 80%. Slurries will generally contain from about 0.1% to about 20% by weight, preferably from about 1% to about 5%. A convenient way of adding the zinc oxide as an aqueous solution is to pass a stream of the water entering the vessel over solid zinc oxide in a receptacle located either in the feed line or in a recirculation loop. A bed of zinc oxide pellets or particles, preferably sintered, will provide effective results.

Examples of ways in which the zinc oxide may be added are described in commonly assigned copending application Ser. No. 900,927, filed Aug. 27, 1986, which is incorporated herein by reference.

The present invention is applicable to water-cooled nuclear reactors in general, including light water reactors and heavy water reactors. The invention finds particular utility in boiling water reactors.

The foregoing is offered primarily for purposes of illustration. It will be readily apparent to those skilled in the art that numerous modifications and variations of the features of construction and operation disclosed herein may be made without departing from the spirit and scope of the invention.

What is claimed is:

1. In the method for inhibiting the deposition of radioactive cobalt in a water-bearing vessel of a water-cooled nuclear reactor which comprises adding zinc ion to water entering said water-bearing vessel, the improvement in which said zinc ion contains a substantially lower proportion of the $^{64}Zn$ isotope than naturally occurring zinc.

2. A method in accordance with claim 1 in which the proportion of $^{64}Zn$ in said zinc ion is less than about 10%.

3. A method in accordance with claim 1 in which the proportion of $^{64}Zn$ in said zinc ion is less than about 1%.

4. A method in accordance with claim 1 in which said zinc ion is substantially devoid of $^{64}Zn$.

5. A method in accordance with claim 1 in which said zinc ion is added by dissolving zinc oxide in said water.

6. A method in accordance with claim 5 in which the amount of zinc oxide dissolved is selected to achieve a concentration of about 1 to about 1,000 ppb zinc in said water-bearing vessel.

7. A method in accordance with claim 5 in which the amount of zinc oxide dissolved is selected to achieve a concentration of about 3 to about 100 ppb zinc in said water-bearing vessel.

8. A method in accordance with claim 5 in which said zinc oxide is dissolved from a member selected from the group consisting of a water-based slurry, a water-based paste and a water-based solution.

9. A method for inhibiting the deposition of radioactive material in a water-bearing vessel of a water-cooled nuclear reactor, said method comprising:

adding a water-based zinc oxide paste to water entering said water-bearing vessel, the zinc in said paste containing a substantially lower proportion of the $^{64}Zn$ isotope than naturally occurring zinc.

10. A method in accordance with claim 9 in which the amount of zinc oxide in said paste is from about 25% to about 95% by weight.

11. A method in accordance with claim 9 in which the amount of zinc oxide in said paste is from about 40% to about 80% by weight.

12. A method for inhibiting the deposition of radioactive cobalt in a water-bearing vessel of a water-cooled nuclear reactor, said method comprising:

adding an aqueous solution of zinc oxide to water entering said water-bearing vessel, the zinc in said zinc oxide containing a substantially lower proportion of the $^{64}Zn$ isotope than naturally occurring zinc.

13. A method in accordance with claim 12 in which said aqueous solution is formed by passing a stream of water drawn from said water entering said water-bearing vessel through a receptacle containing solid zinc oxide retained therein.

14. A method in accordance with claim 13 in which said solid zinc oxide is a bed of zinc oxide particles.

15. A method in accordance with claim 14 in which said zinc oxide particles are sintered zinc oxide.

16. A method for inhibiting the deposition of radioactive cobalt in a water-bearing vessel of a water-cooled nuclear reactor, said method comprising:

adding a slurry of zinc oxide in water to water entering said water-bearing vessel, the zinc in said zinc oxide containing a substantially lower proportion of the $^{64}Zn$ isotope than naturally occurring zinc.

17. A method in accordance with claim 16 in which the zinc oxide content of said slurry is from about 0.1% to about 20% by weight.

18. A method in accordance with claim 16 in which the zinc oxide content of said slurry is from about 1% to about 5% by weight.

19. A method in accordance with claim 16 in which said zinc oxide in said slurry is fumed zinc oxide.

20. A method in accordance with claim 16 in which the rate of addition of said slurry to said water is selected to produce a zinc content in the water of said water-bearing vessel of about 1 to about 1,000 ppb.

21. A method in accordance with claim 16 in which the rate of addition of said slurry to said water is selected to produce a zinc content in the water of said water-bearing vessel of about 3 to about 100 ppb.

* * * * *